United States Patent
Nitsche et al.

(10) Patent No.: US 7,151,272 B2
(45) Date of Patent: Dec. 19, 2006

(54) PHOSPHOR READ-OUT DEVICE AND PHOSPHOR READ-OUT PROCESS

(75) Inventors: Werner Nitsche, Unterhaching (DE); Michael Weinberger, Altenmünster (DE); Ralph Thoma, Augsburg (DE); Georg Reiser, München (DE); Bernhard Sang, München (DE)

(73) Assignee: Agfa-Gevaert HealthCare GmbH, Leverkusen (DE)

( * ) Notice: Subject to any disclaimer, the term of this patent is extended or adjusted under 35 U.S.C. 154(b) by 211 days.

(21) Appl. No.: 10/942,373

(22) Filed: Sep. 16, 2004

(65) Prior Publication Data
US 2005/0092943 A1 May 5, 2005

(30) Foreign Application Priority Data
Oct. 31, 2003 (EP) ................... 03104046

(51) Int. Cl.
*G01N 23/04* (2006.01)
(52) U.S. Cl. ...................................... 250/584
(58) Field of Classification Search ................ 250/584
See application file for complete search history.

(56) References Cited
U.S. PATENT DOCUMENTS 4,922,103 A * 5/1990 Kawajiri et al. ............ 250/586
5,091,970 A    2/1992 Takeo
5,229,618 A * 7/1993 Nakajima ............... 250/559.02
5,404,024 A * 4/1995 Namiki ...................... 250/586

FOREIGN PATENT DOCUMENTS

DE          3503698 A1     8/1986
EP        0 866 501 A1     9/1998
EP        03 10 4046       3/2004

OTHER PUBLICATIONS

Robbins et al., "The Noise Performance of Electron Multiplying Charge-Coupled Devices", IEEE Transactions on Electron Devices, vol. 50, No. 5, May 2003, pp. 1227-1232.

* cited by examiner

*Primary Examiner*—David Porta
*Assistant Examiner*—Mindy Vu
(74) *Attorney, Agent, or Firm*—Houston Eliseeva LLP

(57) ABSTRACT

The present invention reduces the influences of electromagnetic fields during reading out of image signals from memory phosphor films. This is done by pre-amplifying the detection signals obtained from a detection device, in particular a CCD array, before further processing, for example by an analog-to-digital converter. An amplification register for electron multiplying can be used for the amplification. In this way individual photon sensitivity can be achieved when reading out X-ray images.

16 Claims, 2 Drawing Sheets

PHOSPHOR READ-OUT DEVICE AND PHOSPHOR READ-OUT PROCESS

FIELD OF THE INVENTION

The present invention relates to a phosphor read-out device for reading out information stored in a memory phosphor with a detection device, wherein the detection device detects emission radiation emitted by the memory phosphor to obtain detection signals, and a memory device for intermediate storage of the unprocessed detection signals. The present invention additionally relates to a corresponding phosphor read-out process.

Reading out X-ray information stored on an image plate is done in a known manner by stimulating the image plate with stimulation light in the spectral range of visible red light and detection of the stimulated emission light in the spectral range of visible blue light. The emission light is picked up by a detector and converted into corresponding image signals which are amplified in a read-out amplifier connected downstream and then fed to an analog-to-digital converter. A linear, i.e., single-line, charge-coupled device (CCD) is normally used as a detector.

A generic device and a generic process for reading out information stored in a memory phosphor are known from publication EP 1 319 963 A1. Here, emission radiation emitted by the memory phosphor is detected using a detection means. The detection means has a plurality of radiation-sensitive faces with which emission radiation can be received during a preset integration time. The image signals are usually very small owing to the generally weak intensity of the emission light and can be significantly disturbed by electromagnetic fields of adjacent components in the read-out equipment. Moreover, the picture quality may also be impaired by electronic noise of the read-out amplifier and the analog-to-digital converter.

SUMMARY OF THE INVENTION

It is an object of the present invention to reduce the influence of electromagnetic fields and other sources of noise on the image signals.

According to the invention this object is achieved by a phosphor read-out device comprising an amplifying device for the pre-amplification of unprocessed, intermediately stored detection signals prior to subsequent signal processing, for example in an analog-to-digital converter.

In the corresponding phosphor read-out process of the invention the intermediately stored, unprocessed detection signals are pre-amplified prior to subsequent signal processing, for example an analog-to-digital conversion.

The memory device preferably comprises a read-out register and the amplifying device an amplifying register. The read-out register is here favourably operated in parallel for quick read out and the amplifying register serially for achieving a high overall amplification. The detection signals or electric charges corresponding to the individual light-sensitive faces, the so-called pixels, of the detection device are read out in parallel from the detection device and intermediately stored in the read-out register. From there the signals or charges then pass serially, i.e., in succession, through the amplifying register connected downstream from the read-out register.

The detection device, the storage device and the amplifying device can be arranged on a single chip. This reduces production and installation costs and thus the acquisition costs of the phosphor read-out device.

The phosphor read-out device according to the invention is preferably constructed as an electron multiplying CCD (EMCCD). As (pre-)amplification of the charges already takes place in the amplification register of the EMCCD (so-called "on-chip amplification"), the influence of external electromagnetic fields on the correspondingly higher output signals of the EMCCD is reduced. Additionally, the influence of the so-called read-out noise of an analog-to-digital converter connected downstream is considerably reduced. Moreover, a higher quantum efficiency in the spectral range of the emission light is achieved at, for example, 400 nm, by comparison with conventional CCDs.

The detection device can have several detection sections which can be read out and pre-amplified separately from one another. An EMCCD line can for this purpose be composed of several EMCCD segments or sections, for example with 512 light-sensitive detector elements (pixels) in each case. Pre-amplification of the respective image signals then takes place separately in each individual segment. The gain in time by parallel amplification compared with serial amplification during reading out of the whole line has proved an advantage.

Amplification in the amplifying device is preferably variable from pixel to pixel. This has advantages in compensating for local fluctuations in sensitivity, for example based on different light sensitivity of the detector elements of the EMCCD. However, the fluctuations in sensitivity may also be caused by the (focusing) optics based on fluctuations, imaging errors, etc., conditional on manufacture, between the image plate and the detector. The fluctuations in sensitivity can be adequately corrected by appropriate setting of the amplification factor V between typically 1 and 1000.

Moreover, in the amplifying device the amplification can be controlled as a function of the dose of X-ray (so-called speed class) by which the memory phosphor is activated. By appropriate setting of the amplification factor V the image signals can be "standardized" independently of the respective speed class. This means that the amplification factor V is greater as the dose of X-ray becomes smaller.

The amplification can further be settable in the amplifying device in such a way that the pre-amplified read-out signals have a preset dynamic range. For instance, the amplification factor V can be set, for example, in such a way that on subsequent analog-to-digital conversion the entire breadth (e.g., 16 bits) of the analog-to-digital conversion is exhausted.

The ratio between the maximum possible and the minimum possible amplification in the amplifying device is favourably at least 50. In this way the value of the amplification factor V can be preset with great accuracy (e.g., 6 bits and more).

Finally, a device according to the invention is preferred, in which the amplification factor in the amplifying device can be automatically adapted during the reading out of a memory phosphor image. Thus adaptation of the amplification factor V can take place continuously over the image plate during the movement of the scanner, if applicable including a stimulation light source. Adaptation can be done for example by setting the amplification factor as a function of the intensity of the previously received emission light.

BRIEF DESCRIPTION OF THE DRAWINGS

The present invention is now explained in greater detail using the attached drawings.

DETAILED DESCRIPTION OF THE INVENTION

Figure 1:
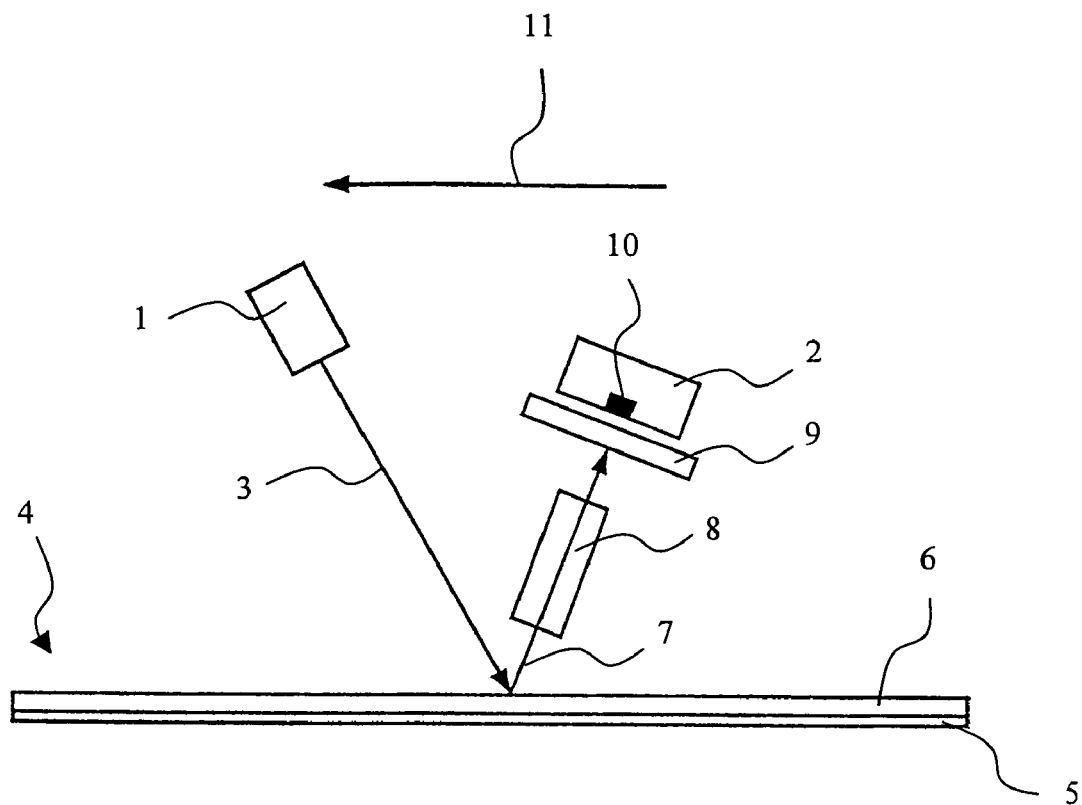
FIG. 1 shows a schematic view of a phosphor read-out device.

The read-out device reproduced schematically in FIG. 1 includes a stimulation light source 1 and a detector 2. The stimulation light source 1 includes several laser diodes arranged on an axis perpendicular to the plane of projection. The light radiated by the stimulation light source 1 is, if applicable, focused by a cylindrical lens, not illustrated. For the sake of clarity, in FIG. 1 only one light beam 3 impinging on an image plate 4 is illustrated. The light beam 3 represents a light incidence plane of the light of the several laser diodes perpendicular to the plane of projection.

The image plate 4 includes a carrier layer 5 and a phosphor film 6 exposed by X-ray radiation. Owing to the stimulation light 3 in the red spectral range the phosphor film 6 is stimulated as a function of the intensity of exposure with X-ray radiation to emit blue light, illustrated by an emission light beam 7. This emission light is directed onto the detector 2 with the aid of focusing optics 8, preferably a micro-lens array, through a filter 9 which allows only the emission light to pass.

The detector 2 has a plurality of light-sensitive detector elements 10, likewise arranged perpendicular to the plane of projection. The entirety of the individual detector elements is configured as an electron multiplying CCD (EMCCD), so there is a linear EMCCD array.

The entire read-out device, constructed in the form of lines, is moved over the image plate 4 in the direction of arrow 11. In so doing all the image dots (pixels) of the phosphor film 6 are read out during a linear movement of the read-out device which is at least as broad as the image plate 4.

Figure 2:
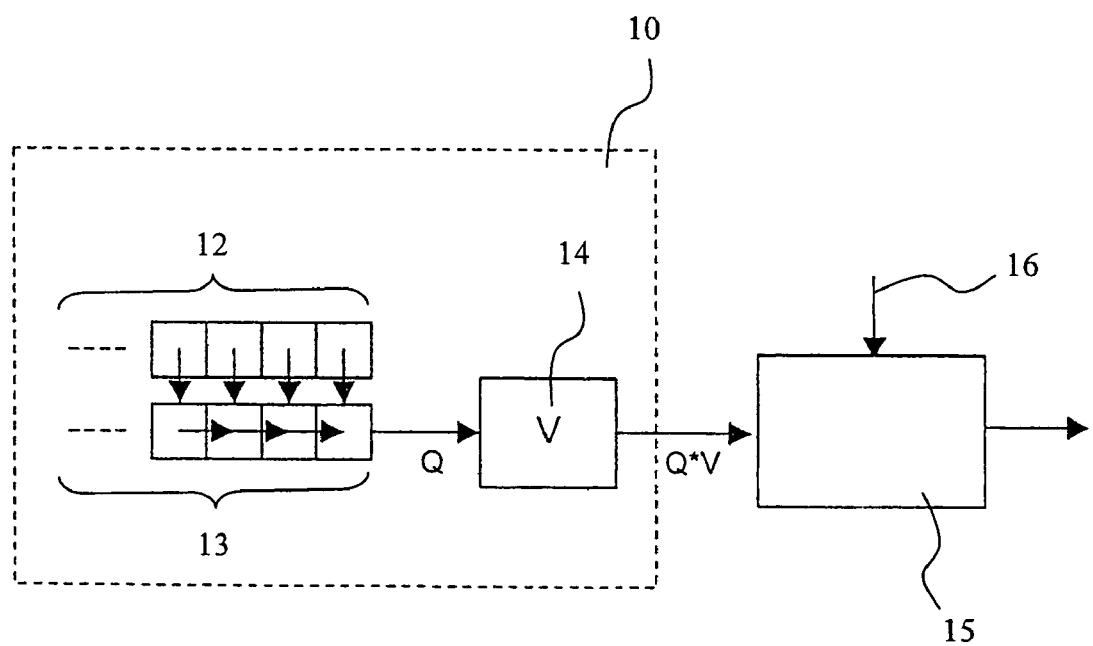
FIG. 2 shows a block diagram of an EMCCD with adjoining analog-to-digital converter.

In FIG. 2 the light-sensitive detector element 10, i.e., the EMCCD array, is illustrated schematically in greater detail. The light-sensitive detector element 10 has an array with light-sensitive faces, in the present case a CCD array 12 with linearly arranged CCDs. During a read-out process the charges of the CCD array 12 are transferred in parallel into a read-out register 13. The charges or photoelectrons Q migrate serially through the read-out register 13 into an amplification register 14. In this amplification register 14 the charges are amplified with an amplification factor V, which, if applicable, is individual to each pixel, so for each pixel an output signal Q*V emerges. Only after this amplification are these signals further processed, indicated in the case of FIG. 2 by an analog-to-digital converter 15. During processing the useful signal is superimposed by a noise signal, symbolised by arrow 16.

The use of EMCCD-based image sensors, supplied, for example, by the manufacturer E2V, allows the noise sources of the read-out amplifier and the analog-to-digital conversion to be reduced to a noise equivalent of less than 1e-rms. This is effected by the amplification of the photoelectrons generated on the chip in one pixel (on-chip amplification) as part of the read-out process in an additional read-out register area (amplification register 14) which each pixel passes through individually during the read-out process. By means of appropriately applied voltages in the amplification register 14 an avalanche effect can be taken advantage of to generate variable amplification of factors between 1 and 1000. The number of electrons in this case increases from element to element of the amplification register, before the signal is digitized by the analog-to-digital converter and read out.

The EMCCD array opens up the possibility of amplifying the measured charge, in particular with low signal amplitudes, and thus substantially improving the signal-to-noise ratio, as the noise contribution is unchanged even after amplification. The potential thus arises, especially in X-ray pictures with a low dose, of reducing the noise of the entire system apart from the unavoidable shot noise, and to achieve individual photon sensitivity.

The invention can be applied to all CCD-based systems, as structural changes in the CCD chip have to be made only in the area of the read-out register.

Thus, a particular advantage of this technology is the almost complete elimination of noise sources from an imaging apparatus in medical X-ray diagnostics, wherein the pre-amplification of the detector signals or charges can be simultaneously adapted to the dose used over a wide range, typically between 1 and 1000.

Figure 3:
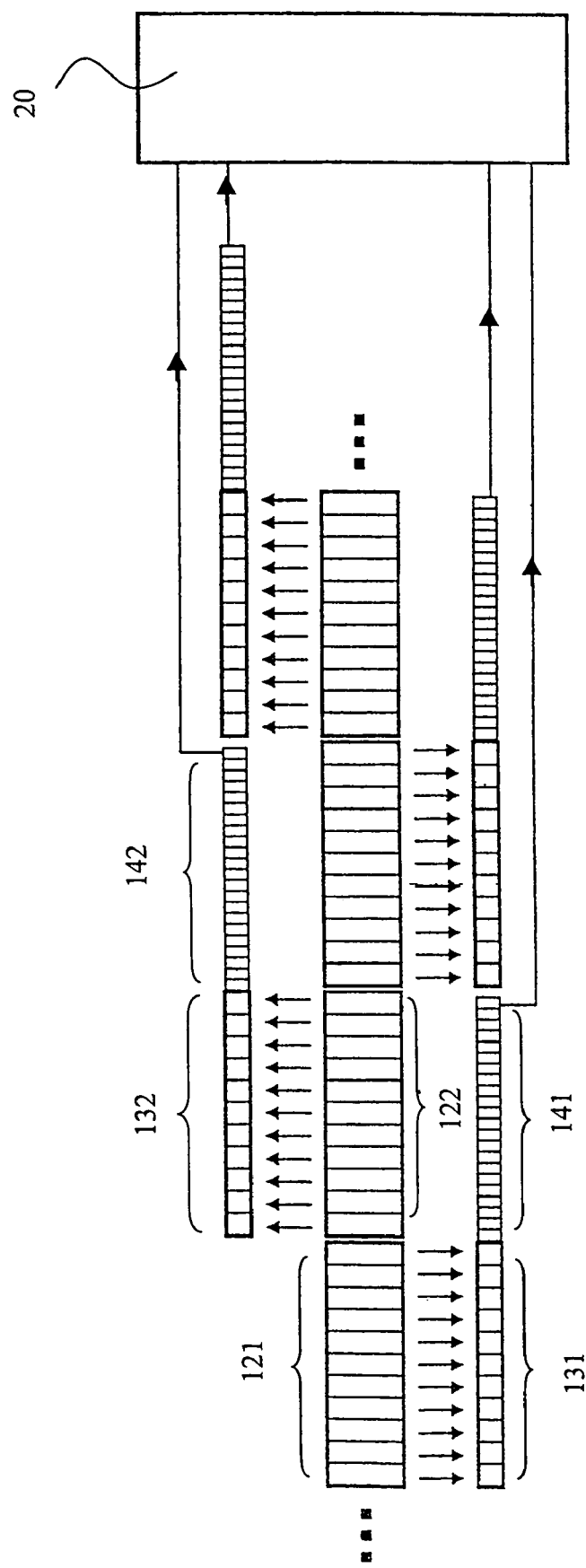
FIG. 3 shows a basic installation plan of an EMCCD with several read-out and amplification registers for one line.

In a second embodiment example the linear EMCCD array according to FIG. 3 is divided into several segments. Each of these segments has a linear CCD array 121 and 122 and a correspondingly assigned read-out register 131 or 132 and an amplification register 141 or 142 connected thereto. Dividing the detector line into several segments and providing an amplification register for each segment in each case enables parallel pre-amplification of signals or charges of different segments. The overall read-out and pre-amplification process is thereby accelerated.

The pre-amplified image signals of the individual segments, i.e., the serial output signals of the individual amplification registers 141, 142, etc., are combined in a processing unit 20 into a image line of the read-out phosphor film. The image lines of the phosphor film obtained during the entire read-out process are finally put together into an overall image of the phosphor film and, if applicable after further processing, can be visually illustrated and drawn on for diagnostic purposes.

We claim:

1. A phosphor read-out device for reading out information stored in a memory phosphor, comprising:
    a detection device for detecting emission radiation emitted by the memory phosphor to obtain unprocessed detection signals;
    a memory device for intermediate storage of the unprocessed detection signals; and
    an amplifying device for pre-amplifying the unprocessed, intermediately stored detection signals prior to subsequent signal processing,
    wherein the amplification in the amplifying device can be set to provide a preset dynamic range.

2. A device as claimed in claim 1, wherein the detection device, the memory device, and the amplifying device are arranged on a single chip.

3. A device as claimed in claim 1, constructed as an electron multiplying CCD.

4. A device as claimed in claim 1, wherein the detection device includes several detection sections which can be read out and pre-amplified separately from one another.

5. A device as claimed in claim 1, wherein the amplification in the amplifying device can be varied from pixel to pixel.

6. A device as claimed in claim 1, wherein an amplification in the amplifying device can be controlled as a function of a dose of X-ray with which the memory phosphor is activated.

7. A device as claimed in claim 1, wherein an amplification factor in the amplifying device is automatically adaptable during a reading out of a memory phosphor image.

8. A phosphor read-out device for reading out information stored in a memory phosphor, comprising:
- a detection device for detecting emission radiation emitted by the memory phosphor to obtain unprocessed detection signals;
- a memory device for intermediate storing of the unprocessed detection signals; and
- an amplifying device for pre-amplifying the unprocessed, intermediately stored detection signals prior to subsequent signal processing, wherein the memory device comprises a read-out register and the amplifying device comprises an amplification register.

9. A phosphor read-out device for reading out information stored in a memory phosphor, comprising:
- a detection device for detecting emission radiation emitted by the memory phosphor to obtain unprocessed detection signals;
- a memory device for intermediate storage of the unprocessed detection signals; and
- an amplifying device for pre-amplifying the unprocessed, intermediately stored detection signals prior to subsequent signal processing,
- wherein a ratio between a maximum possible and a minimum possible amplification in the amplifying device is at least 50.

10. A phosphor read-out process for reading out information stored in a memory phosphor, comprising:
- detecting emission radiation emitted by the memory phosphor to obtain unprocessed detection signals;
- intermediate storing of the unprocessed detection signals; and pre-amplifying the intermediately stored, unprocessed detection signals prior to subsequent signal processing,
- wherein the amplification of the intermediately stored, unprocessed detection signals is set in such a way that the amplified detection signals have a preset dynamic range.

11. A process as claimed in claim 10, wherein the detecting is done by charge-coupling and the amplification by electron multiplying.

12. A process as claimed in claim 10, wherein the detecting is done in several detection sections which are read out and pre-amplified separately from one another.

13. A process as claimed in claim 10, wherein the amplification is set pixel by pixel.

14. A process as claimed in claim 10, wherein the amplification of the detection signals is controlled as a function of a dose of X-ray with which the memory phosphor is activated.

15. A process as claimed in claim 10, wherein the amplification of the detection signals is automatically adapted during the reading out of a memory phosphor image.

16. A phosphor read-out process for reading out information stored in a memory phosphor, comprising:
- detecting emission radiation emitted by the memory phosphor to obtain unprocessed detection signals;
- intermediate storing of the unprocessed detection signals; and
- pre-amplifying the intermediately stored, unprocessed detection signals prior to subsequent signal processing,
- wherein a ratio between a maximum possible and a minimum possible amplification is at least 50.

* * * * *

UNITED STATES PATENT AND TRADEMARK OFFICE
CERTIFICATE OF CORRECTION

PATENT NO. : 7,151,272 B2 Page 1 of 1
APPLICATION NO. : 10/942373
DATED : December 19, 2006
INVENTOR(S) : Werner Nitsche et al.

It is certified that error appears in the above-identified patent and that said Letters Patent is hereby corrected as shown below:

In claim 8, column 5, line 9, delete "storing" and insert --storage--.

Signed and Sealed this

Twenty-seventh Day of March, 2007

JON W. DUDAS
*Director of the United States Patent and Trademark Office*